United States Patent
Szymanski

(10) Patent No.: US 10,815,898 B2
(45) Date of Patent: *Oct. 27, 2020

(54) SEAL ASSEMBLY FOR A STATIC STRUCTURE OF A GAS TURBINE ENGINE

(71) Applicant: UNITED TECHNOLOGIES CORPORATION, Farmington, CT (US)

(72) Inventor: Grace E. Szymanski, Burlington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 243 days.

This patent is subject to a terminal disclaimer.

(21) Appl. No.: 16/111,317

(22) Filed: Aug. 24, 2018

(65) Prior Publication Data

US 2019/0093567 A1 Mar. 28, 2019

Related U.S. Application Data

(63) Continuation of application No. 14/425,117, filed as application No. PCT/US2013/024071 on Jan. 31, 2013, now Pat. No. 10,087,847.

(Continued)

(51) Int. Cl.
*F02C 7/20* (2006.01)
*F02C 7/28* (2006.01)
(Continued)

(52) U.S. Cl.
CPC ............... *F02C 7/28* (2013.01); *F01D 9/065* (2013.01); *F01D 11/005* (2013.01); *F01D 25/162* (2013.01); *F01D 25/24* (2013.01); *F05D 2240/58* (2013.01); *F05D 2240/80* (2013.01); *F05D 2260/36* (2013.01); *Y10T 29/49826* (2015.01)

(58) Field of Classification Search
CPC ........ F01D 9/065; F01D 11/005; F01D 25/24; F01D 25/162; F02C 7/28
USPC ......................................................... 60/796
See application file for complete search history.

(56) References Cited

U.S. PATENT DOCUMENTS

| 4,369,016 A | 1/1983 | Dennison |
| 4,375,891 A | 3/1983 | Pask |

(Continued)

FOREIGN PATENT DOCUMENTS

EP       1359364 A1    11/2003

OTHER PUBLICATIONS

International Search Report and Written Opinion of the International Searching Authority for International application No. PCT/US2013/024071 dated Nov. 7, 2013.

(Continued)

*Primary Examiner* — Jason D Shanske
(74) *Attorney, Agent, or Firm* — Carlson, Gaskey & Olds, P.C.

(57) ABSTRACT

A static structure of a gas turbine engine according to an exemplary aspect of the present disclosure includes, among other things, an outer platform, an inner platform, an airfoil that extends between the outer platform and the inner platform, a service tube disposed at least partially through the airfoil, and a seal assembly that seals between the service tube and one of the outer platform and the inner platform.

20 Claims, 6 Drawing Sheets

Related U.S. Application Data

(60) Provisional application No. 61/705,723, filed on Sep. 26, 2012.

(51) Int. Cl.
*F01D 25/16* (2006.01)
*F01D 9/06* (2006.01)
*F01D 11/00* (2006.01)
*F01D 25/24* (2006.01)

(56) References Cited

U.S. PATENT DOCUMENTS

| | | | |
|---|---|---|---|
| 5,292,227 | A | 3/1994 | Czachor et al. |
| 5,470,114 | A | 11/1995 | Umney et al. |
| 5,597,286 | A | 1/1997 | Dawson et al. |
| 5,941,537 | A | 8/1999 | Wallace et al. |
| 6,431,824 | B2 | 8/2002 | Schotsch et al. |
| 8,245,518 | B2 | 8/2012 | Durocher et al. |
| 10,087,847 | B2 * | 10/2018 | Szymanski ............ F01D 9/065 |
| 2004/0111829 | A1 | 6/2004 | Bruno et al. |
| 2004/0062637 | A1 | 8/2004 | Dube et al. |
| 2005/0247042 | A1 | 11/2005 | Fert et al. |
| 2005/0247043 | A1 | 11/2005 | Derenes et al. |
| 2010/0132369 | A1 | 6/2010 | Durocher et al. |
| 2010/0132374 | A1 | 6/2010 | Manteiga et al. |
| 2010/0135777 | A1 | 6/2010 | Manteiga et al. |
| 2010/0135786 | A1 | 6/2010 | Manteiga et al. |
| 2010/0275572 | A1 | 11/2010 | Durocher et al. |
| 2011/0081237 | A1 | 4/2011 | Durocher et al. |
| 2011/0085895 | A1 | 4/2011 | Durocher et al. |
| 2011/0252808 | A1 | 10/2011 | McKenney et al. |

OTHER PUBLICATIONS

International Preliminary Report on Patentablilty for PCT Application No. PCT/US2013/024071, dated Apr. 9, 2015.
Extended European Search Report for Application No. EP 13 84 2785 dated Oct. 1, 2015.

\* cited by examiner

SEAL ASSEMBLY FOR A STATIC STRUCTURE OF A GAS TURBINE ENGINE

CROSS-REFERENCE TO RELATED APPLICATION

This application is a continuation of U.S. application Ser. No. 14/425,117, filed on Mar. 2, 2015, which is a National Stage Entry of PCT Application No. PCT/US13/024071, filed on Jan. 31, 2013, which claims priority to priority to U.S. Provisional Application Ser. No. 61/705,723, which was filed on Sep. 26, 2012.

BACKGROUND

This disclosure relates to a gas turbine engine, and more particularly to a seal assembly that can be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines may be assembled from numerous coaxial housings and components that must be sealed relative to one another to address pressure differentials and thermal loading that can exist between these components during gas turbine engine operation. For example, static structures, such as mid-turbine frames, ducts, vane assemblies, nozzle assemblies and the like, may need to be sealed relative to cavities that extend between the static structures and inner and outer casings of an engine static structure.

SUMMARY

A static structure of a gas turbine engine according to an exemplary aspect of the present disclosure includes, among other things, an outer platform, an inner platform, an airfoil that extends between the outer platform and the inner platform, a service tube disposed at least partially through the airfoil, and a seal assembly that seals between the service tube and one of the outer platform and the inner platform.

In a further non-limiting embodiment of the foregoing static structure, the seal assembly seals a gap between the inner platform and the service tube.

In a further non-limiting embodiment of either of the foregoing static structures, the airfoil is hollow.

In a further non-limiting embodiment of any of the foregoing static structures, the static structure is a mid-turbine frame.

In a further non-limiting embodiment of any of the foregoing static structures, the seal assembly seals between the inner platform and a bearing system.

In a further non-limiting embodiment of any of the foregoing static structures, the seal assembly includes at least one locking plate and a seal ring.

In a further non-limiting embodiment of any of the foregoing static structures, the seal ring is received in an outer diameter groove of the at least one locking plate.

In a further non-limiting embodiment of any of the foregoing static structures, the seal assembly includes a first plate piece and a second plate piece that are received around a tube end fitting of the service tube.

In a further non-limiting embodiment of any of the foregoing static structures, a bearing support structure is radially inward from the inner platform.

In a further non-limiting embodiment of any of the foregoing static structures, the seal assembly is secured to an adapter of the bearing support structure by at least one fastener.

In a further non-limiting embodiment of any of the foregoing static structures, the service tube includes a tube end fitting that includes a groove, and a seal is positioned within the groove.

In a further non-limiting embodiment of any of the foregoing static structures, the tube end fitting includes a second groove that receives a locking plate of the seal assembly.

A gas turbine engine according to an exemplary aspect of the present disclosure includes, among other things, a compressor section, a combustor section in fluid communication with the compressor section and a turbine section in fluid communication with the combustor section. A static structure is disposed in one of the compressor section and the turbine section and includes an outer platform, an inner platform and an airfoil that extends between the outer platform and the inner platform. A service tube is disposed at least partially through the airfoil. A seal assembly seals between the service tube and one of the outer platform and the inner platform.

In a further non-limiting embodiment of the foregoing gas turbine engine, the static structure is a mid-turbine frame.

In a further non-limiting embodiment of either of the foregoing gas turbine engines, the mid-turbine frame is arranged between a high pressure turbine and a low pressure turbine of the turbine section.

In a further non-limiting embodiment of any of the foregoing gas turbine engines, the seal assembly seals a gap between the inner platform and the service tube.

In a further non-limiting embodiment of any of the foregoing gas turbine engines, the seal assembly includes at least one locking plate and a seal ring.

A method of sealing a static structure of a gas turbine engine according to another exemplary aspect of the present disclosure includes, among other things, positioning a seal assembly around a service tube to seal a gap that extends between the service tube and a first platform of the static structure.

In a further non-limiting embodiment of the foregoing method of sealing a static structure of a gas turbine engine, the method comprises the step of securing the static structure to a bearing support structure.

In a further non-limiting embodiment of either of the foregoing methods of sealing a static structure of a gas turbine engine, the method comprises the step of mounting the service tube to a second platform of the static structure.

The various features and advantages of this disclosure will become apparent to those skilled in the art from the following detailed description. The drawings that accompany the detailed description can be briefly described as follows.

DETAILED DESCRIPTION

Figure 1:
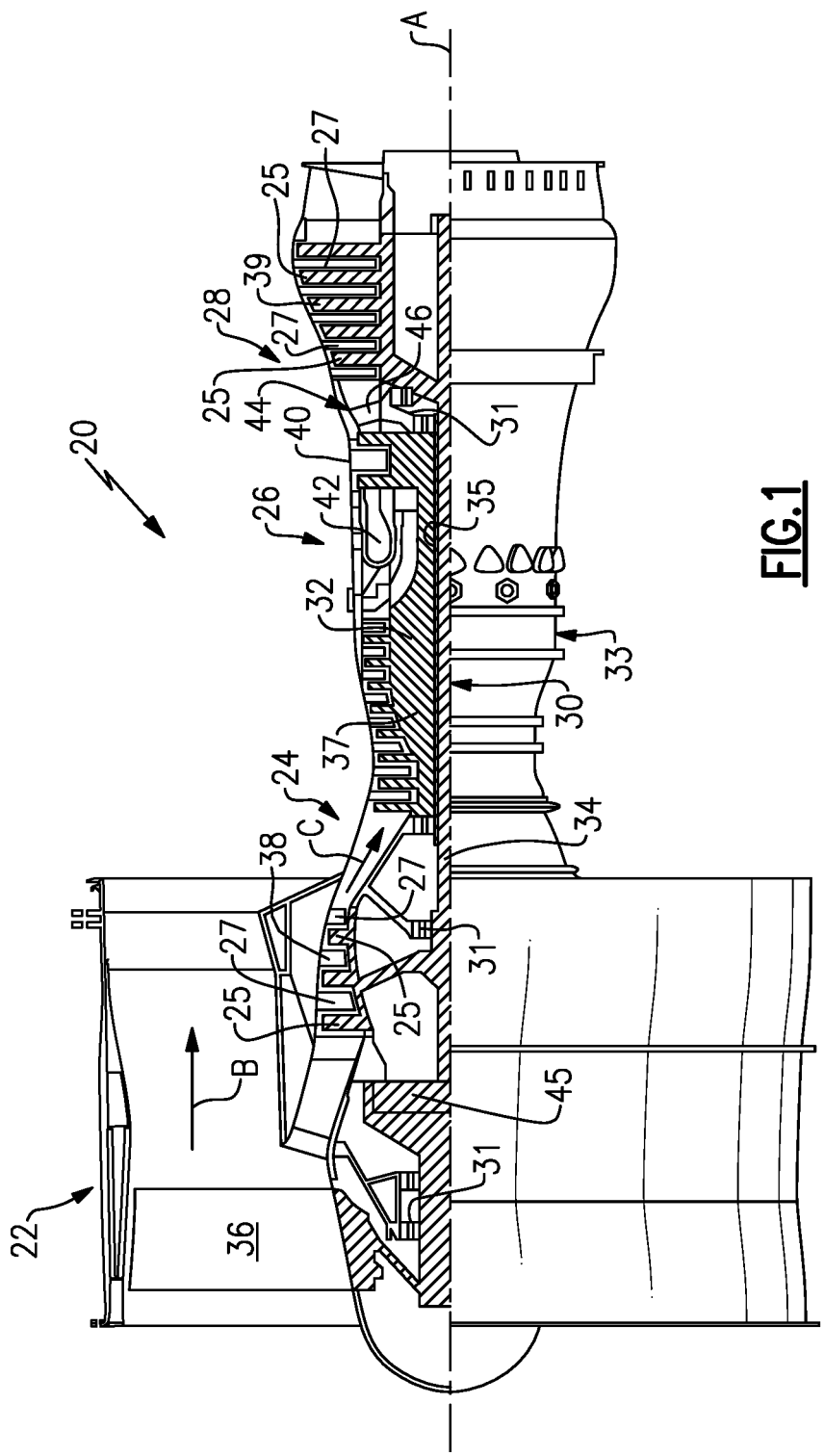
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A static structure 44, or mid-turbine frame, may be arranged generally between the high pressure turbine 40 and the low pressure turbine 39. The static structure 44 can support one or more bearing systems 31 of the turbine section 28. The static structure 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds, which can increase the operational efficiency of the low pressure compressor 38 and low pressure turbine 39 and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2:
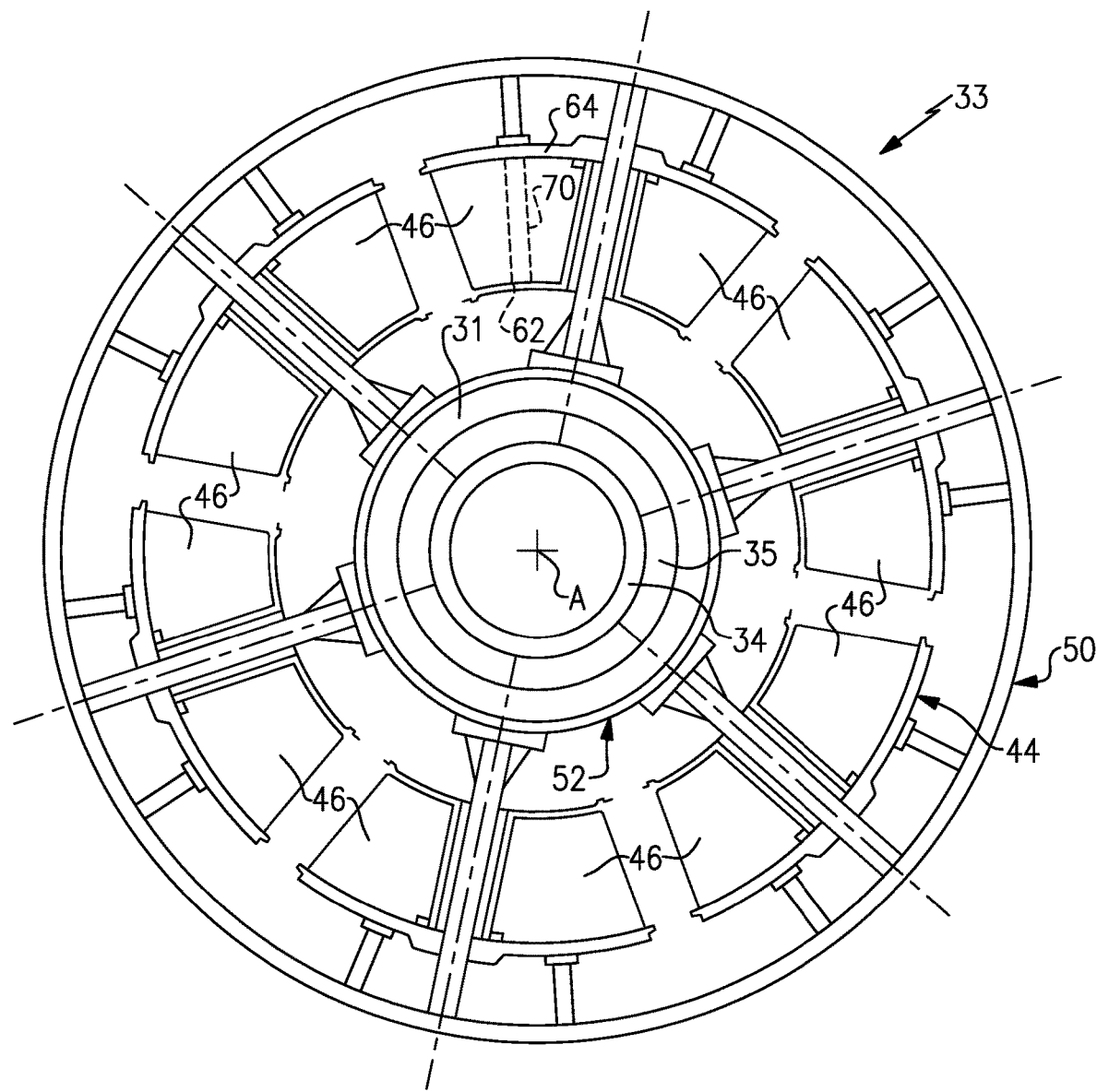
FIG. 2 illustrates a cross-section of a static structure that can be incorporated into a gas turbine engine.

FIG. 2 illustrates a static structure 44 that can be incorporated into a gas turbine engine, such as the gas turbine engine 20. In this example, the static structure 44 is a mid-turbine frame that can be positioned between the high pressure turbine 40 and the low pressure turbine 39 (see FIG. 1). However, the teachings of this disclosure are not limited to the mid-turbine frame and could extend to other static structures, including but not limited to, ducts, vane assemblies, nozzle assemblies and/or other full hoop ring assemblies.

The static structure 44 can be mounted to extend between an outer casing 50 and an inner casing 52 of the engine static structure 33. For example, the outer casing 50 and the inner casing 52 can be part of a turbine exhaust case of the engine static structure 33. The inner casing 52 can support a bearing system 31 as well as other components within which the inner and outer shafts 34, 35 rotate.

The exemplary static structure 44 can include a multitude of airfoils 46 that radially extend between an inner platform 62 and an outer platform 64 of the static structure 44. A service tube 70 can be disposed to at least partially extend through one or more of the multitude of airfoils 46. In other words, the airfoils 46 may be at least partially hollow to accommodate the service tubes 70. The service tube 70 directs airflow radially inwardly to the bearing system 31 and/or other components, such as for cooling or pressurization purposes.

Figure 3:
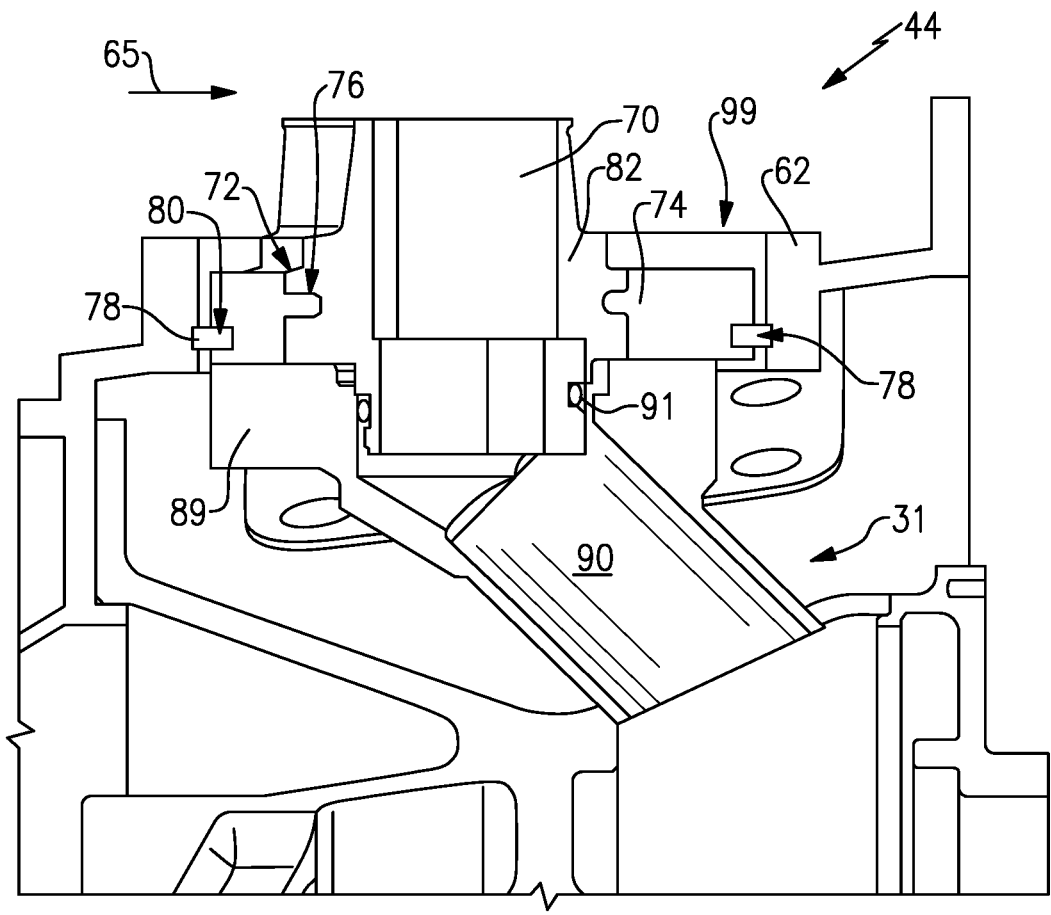
FIG. 3 illustrates a portion of a static structure.

FIG. 3 illustrates a portion of a static structure 44. In this embodiment, the inner platform 62 side of the static structure 44 is illustrated. A seal assembly 72 may be used to seal around the service tube 70. For example, the seal assembly 72 may seal between the inner platform 62 and a bearing system 31 that is radially inward from the static structure 44. In this embodiment, the seal assembly 72 seals a gap 99 that extends between the service tube 70 and the inner platform 62. The seal assembly 72 helps to ensure that the cooling airflow that is communicated to cool and pressurize the bearing system 31 is not heated up by airflow that may leak from a gas path 65 that is communicated through the static structure 44.

The seal assembly 72 may include at least one locking plate 74 and a seal ring 78. The at least one locking plate 74 may be received within a groove 76 of the service tube 70. In this embodiment, the groove 76 is a circumferential groove. The groove 76 may be disposed on a tube end fitting 82 of the service tube 70.

The seal ring 78 of the seal assembly 72 can be received within an outer diameter groove 80 of the locking plate 74. In this embodiment, the outer diameter groove 80 is a circumferential groove. Once installed, the seal assembly 72 can be positioned between the inner platform 62 and the service tube 70.

Figure 4:
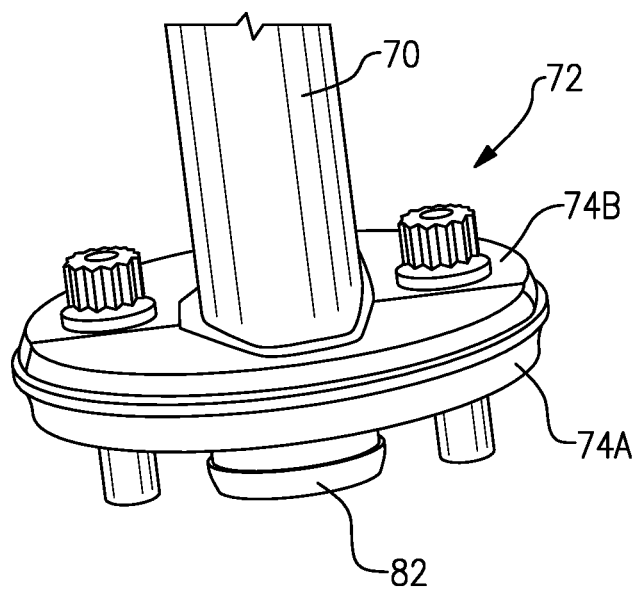
FIG. 4 illustrates a seal assembly for sealing a portion of a static structure.
Figure 5:
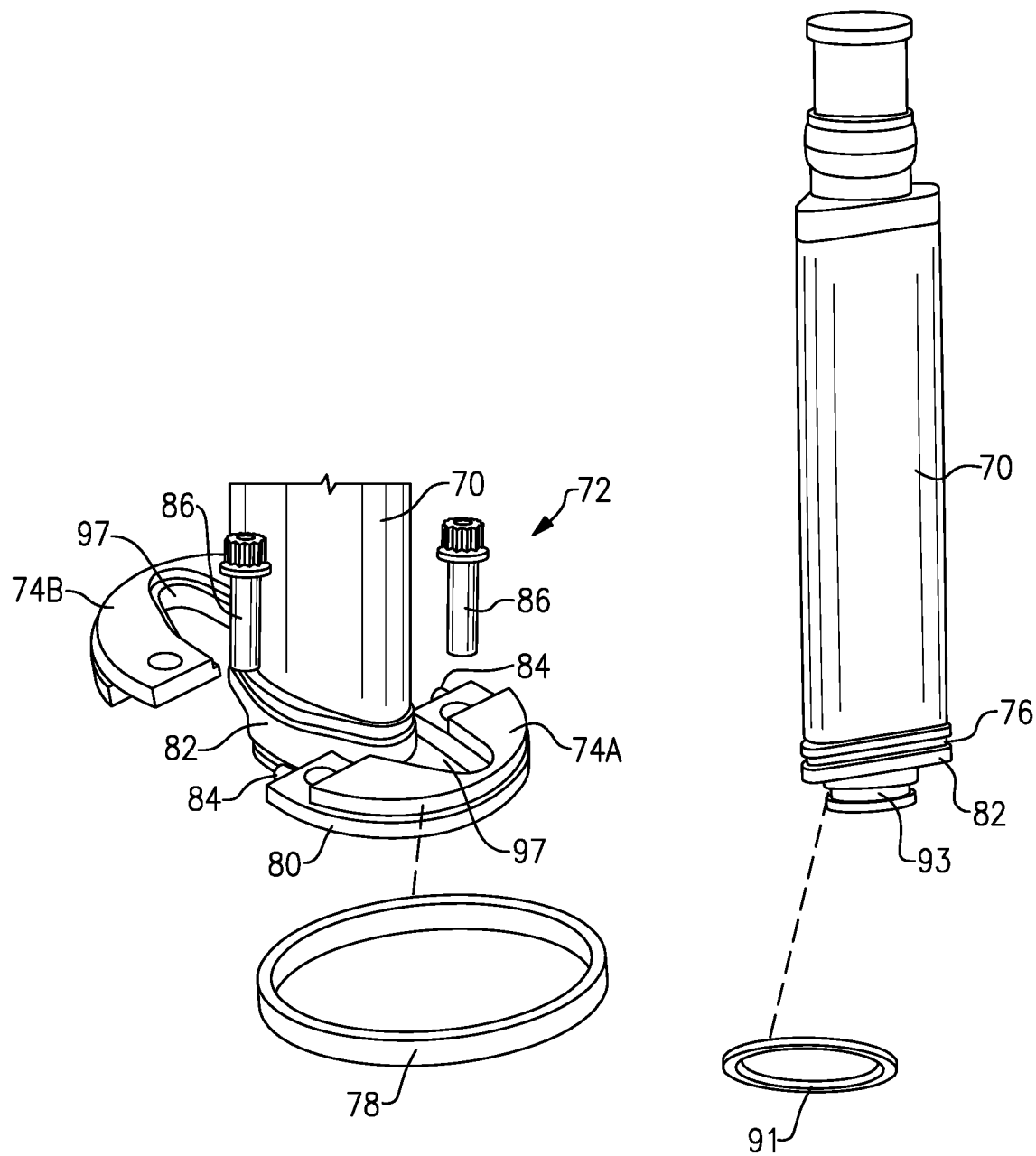
FIG. 5 illustrates an exploded view of a seal assembly.

FIGS. 4 and 5, with continued reference to FIG. 3, illustrate one exemplary seal assembly 72 that can be used to seal a gap between the service tube 70 and the static structure 44. In this embodiment, the seal assembly 72 includes a two-piece locking plate 74 having a first plate piece 74A and a second plate piece 74B. The locking plate 74 can be assembled by inserting one or more prongs 84 of the first plate piece 74A into corresponding openings of the second plate piece 74B (see FIG. 5). Each of the first plate piece 74A and the second plate piece 74B can include a slot 97 for being received about the tube end fitting 82 of the service tube 70.

The seal ring 78 is received in the outer diameter groove 80 that extends about the outer diameter of the locking plate 74. In one embodiment, the seal ring 78 is a metal ring, such as a nickel plated seal ring. However, other materials are also contemplated as within the scope of this disclosure.

The seal assembly 72 further includes one or more fasteners 86, such as bolts, etc., for securing the seal assembly 72 to a bearing support structure 90 (see FIG. 3) of a bearing system 31. In one embodiment, the bearing support structure 90 includes an adapter 89 that may receive a portion of the tube end fitting 82 of the service tube 70 to secure the service tube 70 thereto. A seal 91 can be positioned within a groove 93 of the tube end fitting 82 to seal between the adapter 89 of the bearing support structure 90 and the service tube 70 (see FIG. 3).

FIGS. 6A through 6F schematically illustrate one exemplary method of sealing a portion of a static structure 44. The exemplary method is shown and described for sealing between a service tube 70 and an inner platform 62 of a static structure 44. However, the method could also be utilized to seal the static structure 44 at the outer platform 64.

Figure 6A:
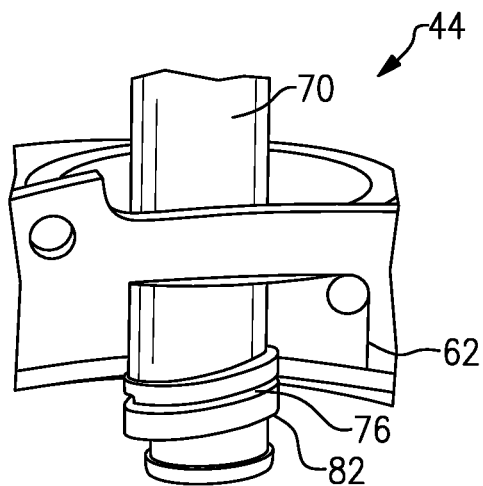
FIGS. 6A, 6B, 6C, 6D, 6E and 6F schematically illustrate a method of sealing a portion of a static structure.

As shown in FIG. 6A, the service tube 70 is assembled in a direction that extends from the outer platform 64 toward the inner platform 62 of the static structure 44. The service tube 70 can be inserted through an airfoil 46 of the static structure 44 and then through the inner platform 62 of the static structure 44 such that the tube end fitting 82 is positioned radially inwardly from the inner platform 62.

Figure 6B:
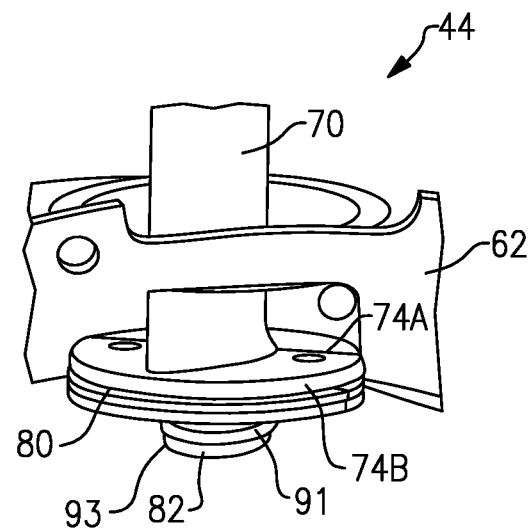

Next, as shown in FIG. 6B, the first and second plate pieces 74A, 74B of the locking plate 74 can be located and secured in the groove 76 of the tube end fitting 82. The seal 91 can be positioned within the groove 93 of the tube end fitting 82. In one example, the seal 91 includes a C-seal. The seal ring 78 may also be positioned within the outer diameter groove 80.

Figure 6C:
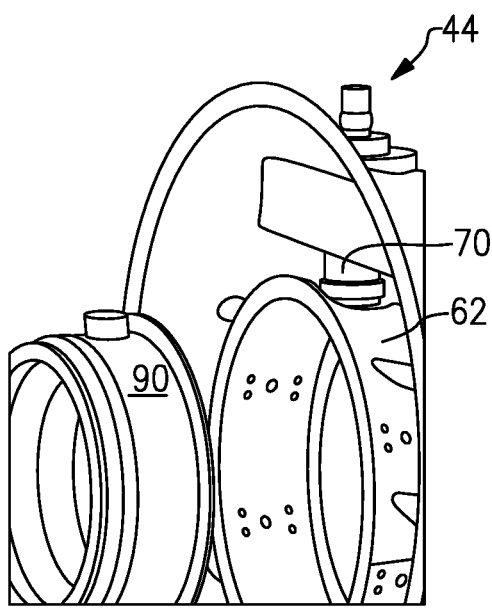

As shown in FIG. 6C, the service tube 70 is next pushed radially outwardly, such as to a position that is above the outer diameter of the inner platform 62, to assemble the bearing support structure 90 to the static structure 44. The bearing support structure 90 can be slid into and assembled with the static structure 44.

Figure 6D:
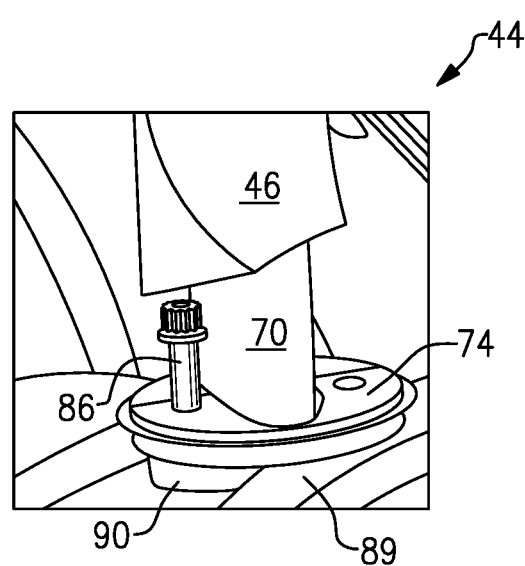

As shown in FIG. 6D, the service tube 70 is positioned within the adapter 89 of the bearing support structure 90 of the bearing system 31 by moving the service tube 70 in a radially inward direction through the inner platform 62. The service tube 70 is secured to the bearing support structure 90 using the locking plate 74 and the fasteners 86, for example.

Figure 6E:
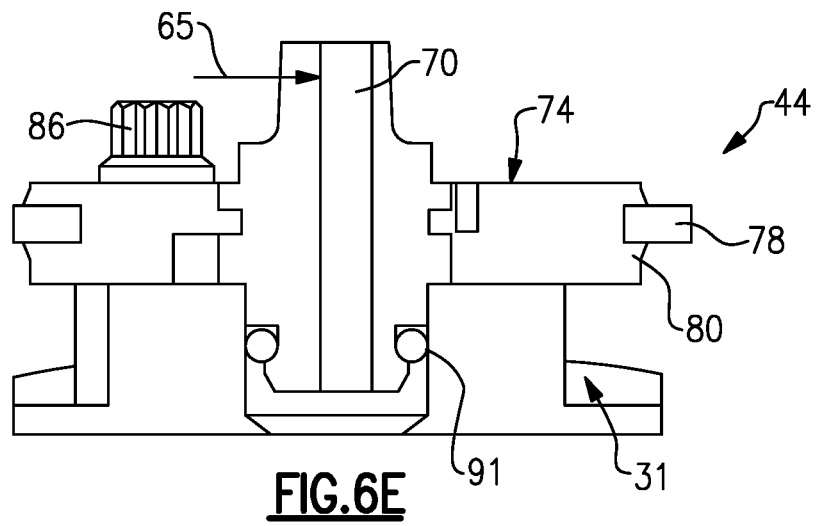

FIG. 6E illustrates positioning of the seal ring 78 at the outer diameter groove 80 of the locking plate 74 to seal around the service tube 70. The seal ring 78 substantially blocks airflow from leaking into the bearing system 31 from the gas path 65.

Figure 6F:
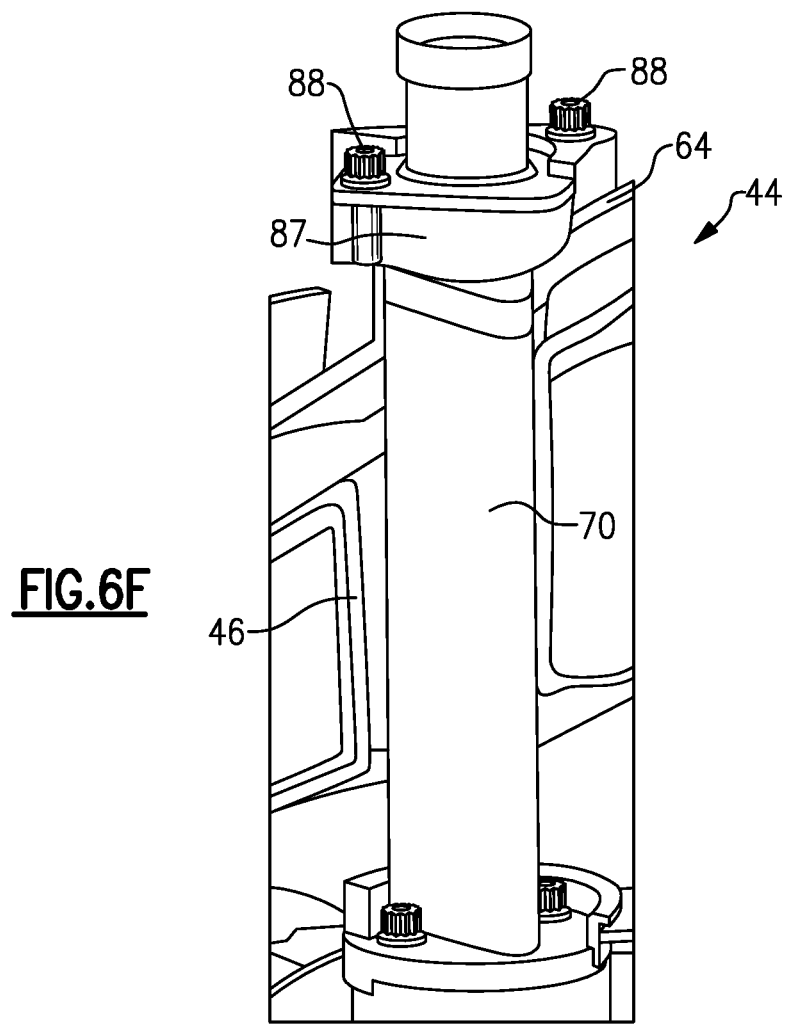

Finally, as shown by FIG. 6F, the service tube 70 can be mounted to the outer platform 64 of the static structure 44. In this embodiment, the service tube 70 includes a positioning plate 87 adapted to mount and seal the service tube 70 at the outer platform 64. Additional fasteners 88 can be used to secure the service tube 70 at the outer platform 64.

The seal assembly 72 described in this disclosure seals between the static structure 44 and the bearing support structure 90 of the bearing system 31 and at the same time secures the service tube 70 to the bearing support structure 90.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
    a compressor section;
    a combustor section in fluid communication with said compressor section;
    a turbine section in fluid communication with said combustor section; and
    a static structure disposed within a core flow path in one of said compressor section and said turbine section and having:
        an outer platform;
        an inner platform;
        an airfoil that extends between said outer platform and said inner platform;
        a service tube disposed at least partially through said airfoil; and
        a seal assembly that seals between said service tube and one of said outer platform and said inner platform.

2. The gas turbine engine as recited in claim 1, wherein said static structure is a mid-turbine frame.

3. The gas turbine engine as recited in 2, wherein said mid-turbine frame is arranged between a high pressure turbine and a low pressure turbine of said turbine section.

4. The gas turbine engine as recited in claim 1, wherein said seal assembly seals a gap between said inner platform and said service tube.

5. The gas turbine engine as recited in claim 1, wherein said seal assembly includes a seal ring and a locking plate.

6. A gas turbine engine, comprising:
    a compressor section;
    a combustor section in fluid communication with said compressor section;
    a turbine section in fluid communication with said combustor section; and
    a static structure disposed within a core flow path in one of said compressor section and said turbine section and having:
        an outer platform;
        an inner platform;
        an airfoil that extends between said outer platform and said inner platform;
        a service tube disposed at least partially through said airfoil; and
        a seal assembly that seals between said service tube and one of said outer platform and said inner platform, said seal assembly including a locking plate received within a groove of said service tube.

7. The gas turbine engine as recited in claim 6, wherein said groove is a circumferential groove.

8. The gas turbine engine as recited in claim 6, wherein said groove is disposed on a tube end fitting of said service tube.

9. The gas turbine engine as recited in claim 6, wherein said service tube includes a second groove, and a seal separate from said seal assembly is received in said second groove.

10. The gas turbine engine as recited in claim 9, wherein said service tube includes a tube end fitting that includes said second groove.

11. The gas turbine engine as recited in claim 10, wherein said tube end fitting is positioned radially inwardly from said inner platform.

12. The gas turbine engine as recited in claim 9, wherein said seal is positioned to seal between an adapter of a bearing support structure and said service tube.

13. The gas turbine engine as recited in claim 9, wherein said seal includes a C-seal.

14. The gas turbine engine as recited in claim 6, wherein said locking plate includes first and second plate pieces.

15. The gas turbine engine as recited in claim 14, wherein said first and second locking plate pieces are located and secured in said groove.

16. A gas turbine engine, comprising:
    a compressor section;
    a combustor section in fluid communication with said compressor section;
    a turbine section in fluid communication with said combustor section; and
    a static structure disposed in one of said compressor section and said turbine section and having:
        an outer platform;
        an inner platform;
        an airfoil that extends between said outer platform and said inner platform;
        a service tube extending within said airfoil and including a tube end fitting that includes a first groove and a second groove;
        a seal positioned in said first groove for sealing between said service tube and a neighboring component; and
        a locking plate positioned in said second groove for sealing between said service tube and one of said outer platform and said inner platform.

17. The gas turbine engine as recited in claim 16, wherein said seal includes a C-seal.

18. The gas turbine engine as recited in claim 16, wherein said seal is positioned to seal between an adapter of a bearing support structure and said service tube.

19. The gas turbine engine as recited in claim 16, wherein said tube end fitting is positioned radially inwardly from said inner platform.

20. The gas turbine engine as recited in claim 16, wherein said locking plate includes first and second plate pieces, and said first and second locking plate pieces are located and secured in said second groove.

* * * * *